(12) United States Patent
Choi et al.

(10) Patent No.: US 11,231,496 B2
(45) Date of Patent: Jan. 25, 2022

(54) RADAR DEVICE AND METHOD OF DETECTING PASSENGER ON REAR SEAT BY USING THE SAME

(71) Applicant: DIGITAL EDGE INC., Anyang-si (KR)

(72) Inventors: Soo Ho Choi, Seongnam-si (KR); Hee Jin Yang, Seoul (KR)

(73) Assignee: DIGITAL EDGE INC., Anyang-si (KR)

( * ) Notice: Subject to any disclaimer, the term of this patent is extended or adjusted under 35 U.S.C. 154(b) by 307 days.

(21) Appl. No.: 16/495,708

(22) PCT Filed: Mar. 27, 2019

(86) PCT No.: PCT/KR2019/003551
§ 371 (c)(1),
(2) Date: Sep. 19, 2019

(87) PCT Pub. No.: WO2020/130231
PCT Pub. Date: Jun. 25, 2020

(65) Prior Publication Data
US 2021/0096236 A1    Apr. 1, 2021

(30) Foreign Application Priority Data
Dec. 18, 2018  (KR) .................. 10-2018-0163914

(51) Int. Cl.
*G01S 13/536* (2006.01)
*B60Q 9/00* (2006.01)
(Continued)

(52) U.S. Cl.
CPC .............. *G01S 13/536* (2013.01); *B60Q 9/00* (2013.01); *G01S 7/352* (2013.01); *H04W 4/14* (2013.01); *G01S 7/356* (2021.05)

(58) Field of Classification Search
CPC .. G01S 13/536; G01S 2007/356; G01S 7/352; G01S 13/343; G01S 13/56;
(Continued)

(56) References Cited

U.S. PATENT DOCUMENTS

2002/0029103 A1* 3/2002 Breed ................ B60R 21/0154
701/45
2007/0193811 A1* 8/2007 Breed ................ B60R 21/0152
180/271
(Continued)

FOREIGN PATENT DOCUMENTS

JP      4501737 B2      7/2010
JP    2018-115930 A    7/2018
(Continued)

*Primary Examiner* — Timothy X Pham
(74) *Attorney, Agent, or Firm* — Novick, Kim & Lee, PLLC; Jae Youn Kim (57) ABSTRACT

Provided is a radar device and a rear seat detection method thereof, in which the method includes: (a) transmitting a radar signal in a form of a multi-channel high-speed FMCW to a periphery of the rear seat and receiving a signal reflected from a target by a transceiver; (b) detecting a motion of the passenger through a macro speed detection scheme by a signal processor; (c) detecting a change according to characteristics of the passenger through a micro speed detection scheme; and (d) determining, by a passenger detector, that the passenger is present on the rear seat when the motion or the change is detected in step (b) or step (c). Accordingly, a multi-channel high-speed FMCW radar waveform is employed to simultaneously detect the motion of the passenger detected through the macro speed detection scheme and a change caused by respiration of the passenger detected through the micro speed detection scheme, so that the passenger in the rear seat is accurately detected.

6 Claims, 8 Drawing Sheets

(51) Int. Cl.
 *G01S 7/35* (2006.01)
 *H04W 4/14* (2009.01)
(58) Field of Classification Search
 CPC .......... G01S 13/62; G01S 7/356; G01S 7/415;
 B60Q 9/00; H04W 4/14; B60R 21/0153;
 B60R 21/01542; B60R 21/01566
 See application file for complete search history.

(56) References Cited

U.S. PATENT DOCUMENTS

| | | | |
|---|---|---|---|
| 2009/0295620 A1* | 12/2009 | Greendale | G01S 13/5244 |
| | | | 342/28 |
| 2018/0253959 A1* | 9/2018 | Andrade | G08B 21/24 |
| 2018/0292521 A1* | 10/2018 | Saitou | G08B 25/10 |
| 2018/0370431 A1* | 12/2018 | Wincek | G01V 3/088 |
| 2019/0293777 A1* | 9/2019 | Takemoto | G01S 13/42 |
| 2020/0118409 A1* | 4/2020 | Yang | A61B 5/1114 |

FOREIGN PATENT DOCUMENTS

| | | |
|---|---|---|
| KR | 10-1170292 B1 | 7/2012 |
| KR | 10-1505044 B1 | 3/2015 |
| KR | 10-1513878 B1 | 4/2015 |
| KR | 10-1533066 B1 | 7/2015 |
| KR | 10-1786039 B1 | 10/2017 |

* cited by examiner

RADAR DEVICE AND METHOD OF DETECTING PASSENGER ON REAR SEAT BY USING THE SAME

TECHNICAL FIELD

The present invention relates to a radar device, and more particularly, to a radar device for detecting and guiding a passenger riding in a rear seat of a vehicle by using a radar, and a method of detecting a passenger on a rear seat by using the radar device.

BACKGROUND ART

Radars detect a target by using radio waves to transmit signals and receive some reflection signals reflected from a target, and measure a distance and a speed of the target by using a delay time of a detected target signal and a Doppler effect.

In addition, an angle of the detected target is measured by rotating one antenna that has a narrow-bandwidth beam width, or measured by using channels of multiple antennas to employ schemes such as amplitude monopulse, phase monopulse, interferometry, and digital beamforming.

The applicant has disclosed radar device technologies in many documents such as Patent document 1 and Patent document 2 set forth below and obtained the patent right by filling the Patent documents.

In general, radar sensors measure target information by using various radar waveforms of pulsed Doppler radars, frequency-modulated continuous wave (hereinafter referred to as "FMCW"), stepped-frequency continuous wave (hereinafter referred to as "SFCW"), and frequency shift keying (hereinafter referred to as "FSK") radars, and the like.

In general, the pulsed Doppler radars are used as radars for long-range detection, and the FMCW/SFCW/FSK radars are used for close-range detection.

Such radar sensors are applied to a vehicle radar device to prevent collisions during driving and to support safe driving.

Meanwhile, in recent years, a rear seat passenger notification device for detecting whether a passenger of a rear seat, especially an infant, remains inside a vehicle to provide a guide when a driver gets out of the vehicle has been developed.

The rear seat passenger notification device generates a driver' seat cluster warning and a warning sound if the passenger in the rear seat is detected when the driver gets out of the vehicle.

If the driver locks a door after getting out of the vehicle without recognizing the infant in the rear seat, the rear seat passenger notification device detects a motion inside the vehicle by operating an ultrasonic sensor mounted on a ceiling of the vehicle.

Accordingly, when a motion of the passenger in the rear seat is detected, the rear seat passenger notification device generates a horn sound, flashes on and off a headlamp, and sends a text message to prevent an accident related to the infant left in the vehicle.

DOCUMENTS OF RELATED ART (Patent document 1) Korean Patent Registration No. 10-1513878 (published on Apr. 22, 2015)
(Patent document 2) Korean Patent Registration No. 10-1505044 (published on Mar. 24, 2015)

DISCLOSURE

Technical Problem

However, the rear seat passenger notification device according to the related art detects the passenger in the rear seat by using the ultrasonic sensor that measures only distance information, so that the rear seat passenger notification device may not determine whether the target detected in the rear seat is a person (or an animal) or an object.

In addition, the rear seat passenger notification device according to the related art may generate a false alarm when a motion is detected from a periphery of the vehicle, or when a large vehicle passes by while the vehicle is stopped.

Therefore, there is a demand for developing a technology for accurately detecting the passenger on the rear seat without being affected by an interference signal even if there is an interference signal caused by a motion at the periphery of the vehicle by applying a high-precision high-resolution radar sensor that may detect a distance and an angle with respect to the target and a movement speed of the target.

To solve the problems described above, one object of the present invention is to provide a radar device and a rear seat passenger detection method thereof, capable of detecting a passenger and an object remaining in a rear seat of a vehicle by distinguishing the passenger from the object to alert only when the passenger is riding.

Another object of the present invention is to provide a radar device and a rear seat passenger detection method thereof, capable of accurately detecting the passenger on the rear seat regardless of an interference signal caused by a motion at a periphery of the vehicle.

Still another object of the present invention is to provide a radar device and a rear seat passenger detection method thereof, capable of identifying and detecting a position of the passenger remaining in the rear seat of the vehicle.

Technical Solution

To achieve the objects described above, according to the present invention, there is provided a radar device including: a transceiver for transmitting a signal through multiple channels and receiving a reflected signal; a signal processor for processing the signal received through each of the channels of the transceiver; and a passenger detector for detecting a passenger on a rear seat by detecting a distance to a target and a speed of the target based on the processed signal and comparing the distance to the target and the speed of the target detected in each of the multiple channels, wherein the signal processor detects a motion of the passenger through a macro speed detection scheme and detects a change according to characteristics of the passenger through a micro speed detection scheme, and the micro speed detection scheme is for detecting a change caused by respiration of the passenger who is asleep by using a repetition interval corresponding to a plurality of repetition intervals of a chirp signal which is used for the detection in the macro speed detection scheme.

In addition, to achieve the objects described above, according to the present invention, there is provided a method of detecting a passenger on a rear seat by using a radar device, the method including: (a) transmitting a radar signal in a form of a multi-channel high-speed FMCW to a periphery of the rear seat and receiving a signal reflected from a target by a transceiver; (b) detecting a motion of the passenger through a macro speed detection scheme by a signal processor; (c) detecting a change according to characteristics of the passenger through a micro speed detection scheme; and (d) determining, by a passenger detector, that the passenger is present on the rear seat when the motion or the change is detected in step (b) or step (c), wherein the micro speed detection scheme is for detecting a change caused by respiration of the passenger by using a repetition interval corresponding to a plurality of repetition intervals of a chirp signal which is used for the detection in the macro speed detection scheme.

Advantageous Effects

As described above, in accordance with the radar device and the rear seat passenger detection method thereof according to the present invention, a multi-channel high-speed FMCW radar waveform is employed to simultaneously detect a motion of a passenger detected through a macro speed detection scheme and a change caused by respiration of the passenger detected through a micro speed detection scheme, so that the passenger of a rear seat can be accurately detected.

In addition, according to the present invention, since a multi-channel high-speed FMCW radar capable of detecting a distance is adopted instead of a conventional continuous wave (CW) radar scheme, influence due to an external interference signal caused by a motion at a periphery of a vehicle is removed, so that the passenger can be detected only within a specific range inside the vehicle.

In other words, according to the present invention, since the multi-channel high-speed FMCW radar waveform is used, an interference signal from an outside of the vehicle can be effectively removed, and it is determined whether a detected target is a passenger or an object through the macro and micro speed detection schemes, so that a false alarm for the object can be removed.

In addition, according to the present invention, even when the passenger is in a sleeping state without a motion, the presence of the passenger on the rear seat can be detected by measuring a minute change due to characteristics of the passenger, for example, the respiration, and an alarm can be generated.

BEST MODE

Mode for Invention

Hereinafter, a radar device and a rear seat passenger detection method thereof according to an exemplary embodiment of the present invention will be described in detail with reference to the accompanying drawings.

Figure 1:
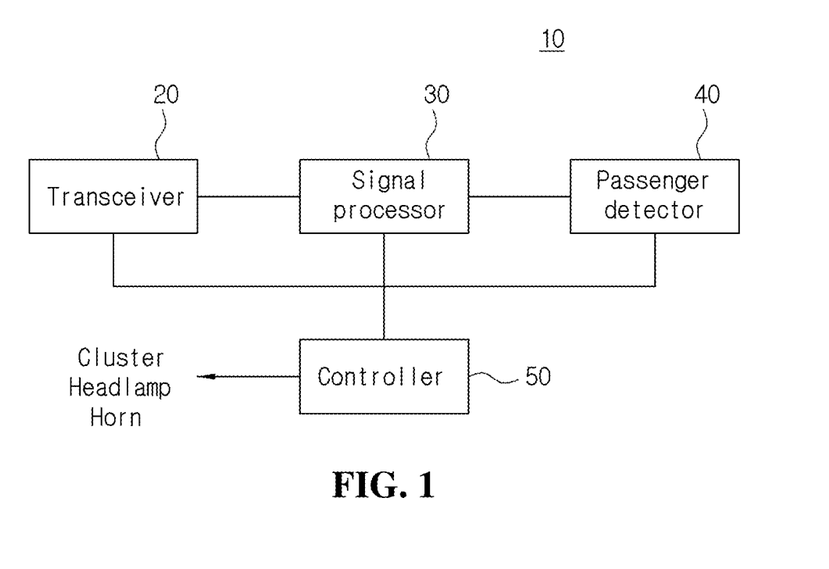
FIG. 1 is a block diagram showing a radar device according to an exemplary embodiment of the present invention.

FIG. 1 is a block diagram showing a radar device according to the exemplary embodiment of the present invention.

As shown in FIG. 1, a radar device 10 according to the exemplary embodiment of the present invention includes: a transceiver 20 for transmitting a signal through multiple channels and receiving a reflected signal; a signal processor 30 for processing the signal received through each of the channels of the transceiver; and a passenger detector 40 for detecting a passenger on a rear seat by detecting a distance to a target and a speed of the target based on the processed signal and comparing the distance to the target and the speed of the target detected in each of the multiple channels.

In addition, the radar device 10 according to the exemplary embodiment of the present invention may further include a controller 50 for controlling the driving of each device, wherein the controller 50 may perform a control to notify of a rear seat passenger detection result by operating at least one of a cluster, an alarm, and a headlamp of the vehicle, and to transmit a text message to a pre-stored telephone number through a communication network when the passenger is detected in the rear seat.

The radar device 10 may be installed in a central portion or a side portion of a ceiling of the vehicle in proximity to the rear seat to detect the passenger riding in the rear seat.

According to the present invention, the passenger in the rear seat may be detected by using a macro speed detection scheme of detecting a motion of the passenger as the passenger riding in the vehicle moves an aim, a leg, an upper body, or the like, and a micro speed detection scheme of detecting characteristics of the passenger who is asleep or without motions of the aim, the leg, and the upper body, for example, a change in the upper body due to the respiration.

For example, frequencies for measuring the motion and respiration of the passenger in a sleeping state, which are frequencies for measuring a motion, especially a speed component, may be detected in the frequency range of about 1 Hz to several MHz.

A continuous wave (CW) radar may be suitable for such macro and micro speed detection. However, since a measurement distance has to be limited within an inside of the vehicle, distance information has to be detected together with the speed.

However, the CW radar only detects a speed of a target and may not detect the distance information, so that the CW radar is sensitive to and influenced by an interference signal caused by a motion at a periphery of the vehicle.

Accordingly, the present invention may detect the presence of the passenger on the rear seat by modifying a waveform of a conventional frequency-modulated continuous wave (FMCW) radar to measure periodicity of the respiration of the passenger, and may alert a driver with detected information when the passenger in the rear seat is detected.

Figure 2:
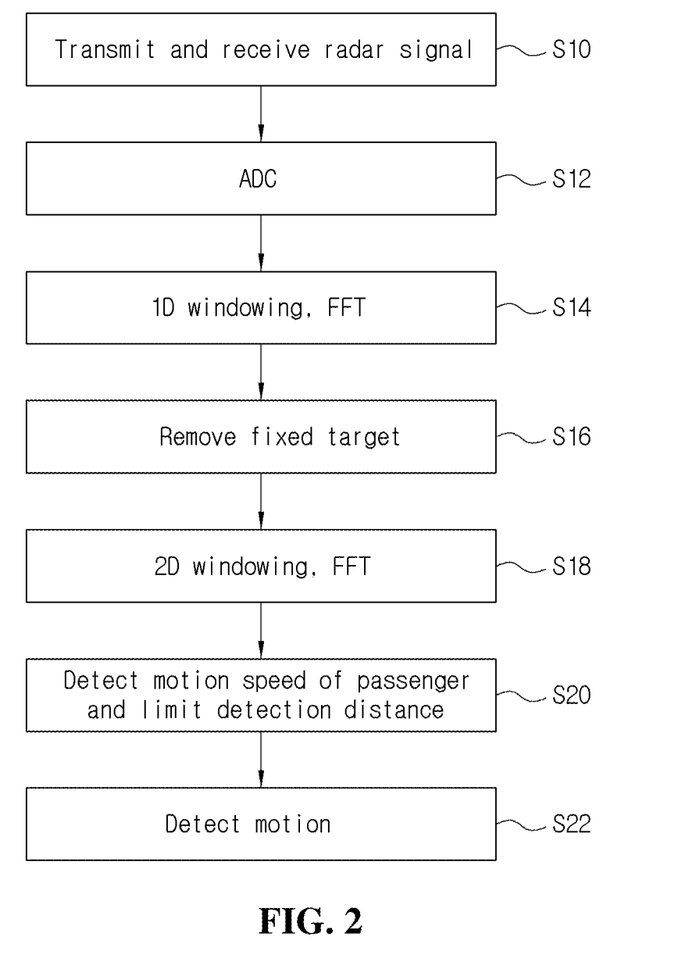
FIG. 2 is a flowchart showing a target detection process of a fast FMCW radar device.
Figure 3:
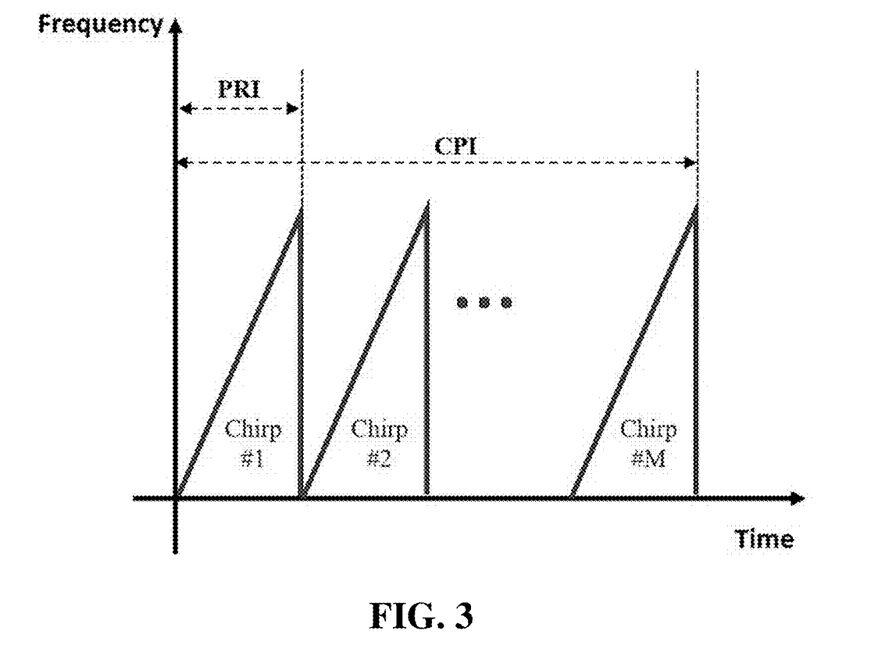
FIG. 3 is a view illustrating a fast FMCW radar waveform.

For example, FIG. 2 is a flowchart showing a target detection process of a fast FMCW radar device, and FIG. 3 is a view illustrating a fast FMCW radar waveform.

When a power is supplied to a vehicle radar device 10 in step S10 of FIG. 2, the controller 20 may generate a control signal to transmit a radar signal.

The controller 50 may generate the radar signal in the form of a multi-channel high-speed FMCW, and the transceiver 20 may convert the radar signal into an RF signal to transmit the RF signal to a periphery of the rear seat through a transmission antenna, receive the signal reflected from the target through a reception antenna 12 to amplify the signal and remove a noise from the signal, and convert the signal into an IF signal to transmit the IF signal to the signal processor 30.

Then, an AD converter (not shown) provided in the signal processor 30 may convert a detection signal which is in the form of an analog signal into a digital signal (S12). The signal processor 30 may perform one-dimensional (hereinafter referred to as "1D") windowing and fast Fourier transform (hereinafter referred to as "FFT") on the detection signal which is converted into the digital signal (S14), and may remove a fixed target inside the vehicle (S16).

The signal processor 30 may perform 2D windowing and the FFT on the signal from which the fixed target is removed in step S18, may detect a motion speed of the passenger (S20), and may limit a detection distance to a predetermined distance to remove a motion at the periphery of the vehicle (S20) so as to detect the motion of the passenger inside the vehicle (S22).

Such steps S10 to S22 are referred to as "macro speed detection scheme".

In this case, as shown in FIG. 3, the fast FMCW radar waveform is a radar waveform for simultaneously detecting a distance and a speed of the target.

In the present embodiment, such a fast FMCW radar waveform is employed, so that only the target detected within a specific distance range may be determined as the target of interest based on the distance information detected through the 1D FFT.

In the fast FMCW radar waveform shown in FIG. 3, the relation between a maximum detection speed $V_{max}$ and a pulse repetition interval (hereinafter referred to as "PRI") representing a repetition interval of a chirp signal may be defined by Mathematical expression 1 below.

$$PRI \leq \frac{\lambda}{4 \cdot V_{max}} \quad \text{[Mathematical expression 1]}$$

In this case, the PRI represents the repetition interval of the chirp signal, and λ is a wavelength of the chirp signal.

As PRI decreases in Mathematical expression 1, the maximum detection speed for detecting the target is increased.

The relation between a detection speed resolution ΔV and a coherence processing interval (hereinafter referred to as "CPI") may be defined by Mathematical expression 2 below.

$$CPI = \frac{\lambda}{2 \cdot \Delta V} \quad \text{[Mathematical expression 2]}$$

In this case, the CPI is a length of time of an entire chirp signal, so a target detection speed resolution becomes higher as the CPI increases.

As described above, the macro speed detection scheme may detect the presence of the passenger on the rear seat by detecting the motion of the passenger on the rear seat.

As described above, according to the present invention, basically, based on the speed detected by the macro speed detection scheme, it may be determined as an object if the speed is not detected, and it may be determined that the passenger in the rear seat is present if the speed is detected.

Meanwhile, the macro speed detection scheme may not detect the passenger on the rear seat when the passenger in the rear seat is without a motion, such as in a sleeping state.

Therefore, when detecting the passenger based only on the macro speed detection scheme, it is difficult to detect the passenger without a motion, such as in a sleeping state, and a false alarm may be generated due to motion ate the periphery of the vehicle.

Therefore, according to the present invention, a multi-channel high-speed FMCW technique is used, so that the characteristics of the passenger, for example, a speed at which the arm, the leg, a torso, or the like of the passenger in the rear seat is minutely moved due to the respiration may be measured through the micro speed detection scheme.

Figure 4:
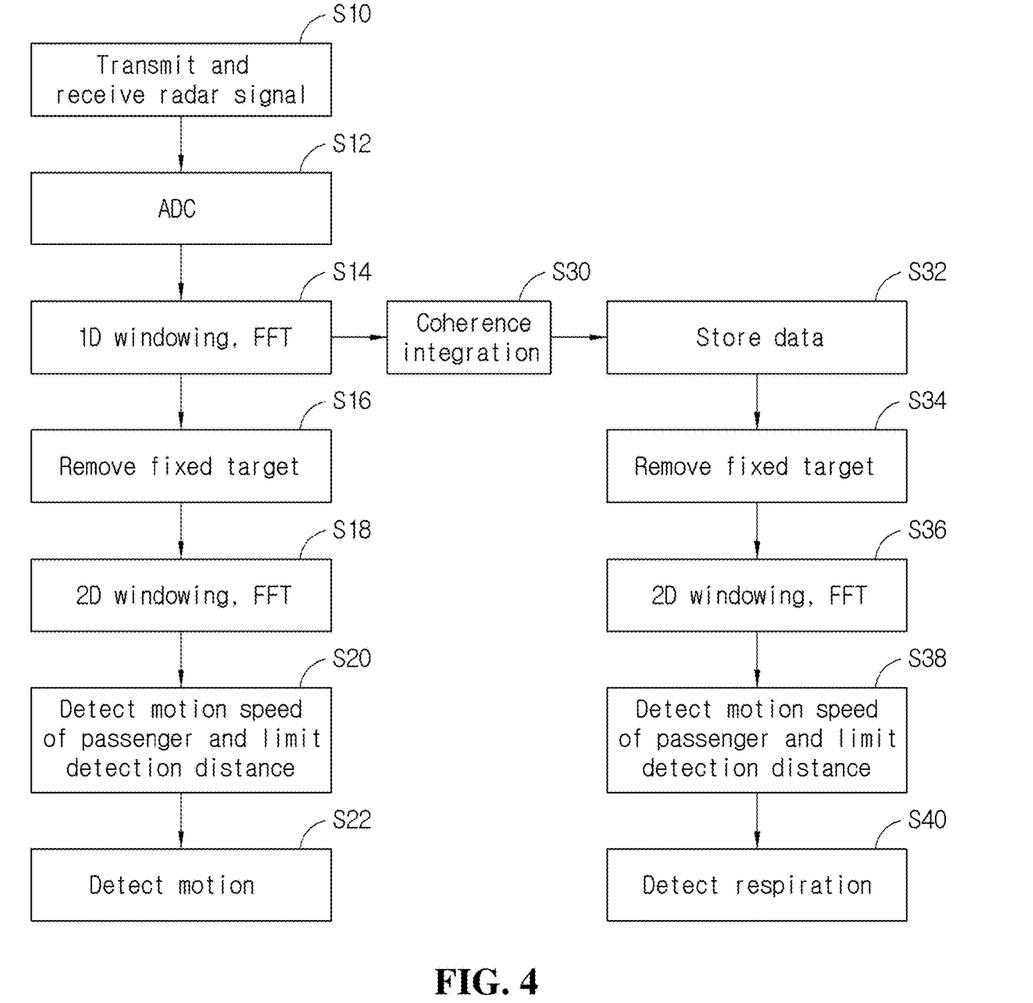
FIG. 4 is a flowchart for describing a signal processing process of a multi-channel high-speed FMCW radar device.
Figure 5:
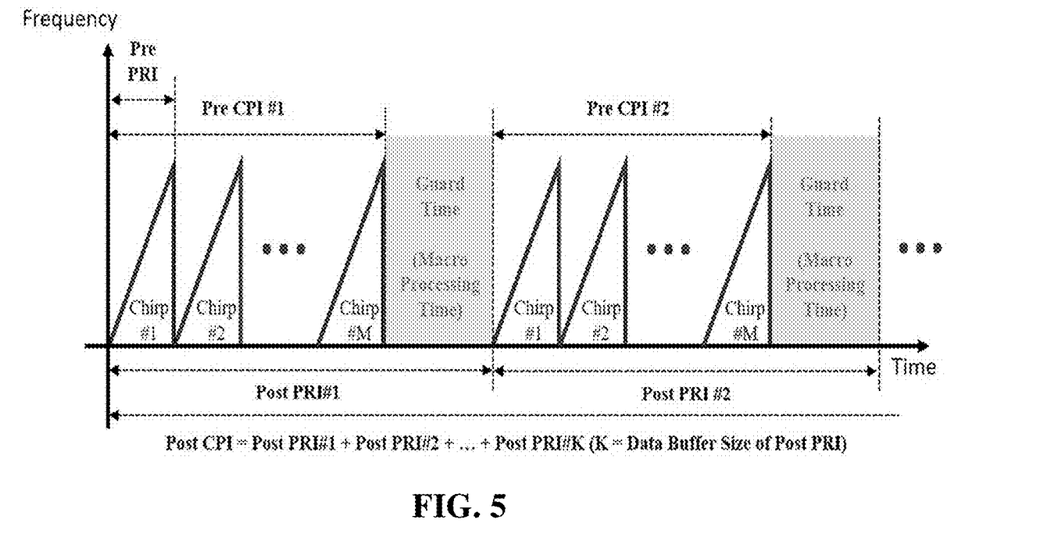
FIG. 5 is a view showing a multi-channel high-speed FMCW radar waveform.

FIG. 4 is a flowchart for describing a signal processing process of a multi-channel high-speed FMCW radar device, and FIG. 5 is a view showing a multi-channel high-speed FMCW radar waveform.

In FIG. 4, steps S10 to S22 are the same as the corresponding steps in a macro speed detection process described with reference to FIG. 2, so the redundant descriptions thereof will be omitted.

In step S30, the signal processor 30 may remove a macro speed corresponding to the motion of the passenger by performing coherence integration on data which is obtained by performing the 1D windowing and the FFT in step S14. The data may be stored as a post PRI which will be described below (S32).

Then, the signal processor 30 may remove the fixed target inside the vehicle by using the data stored as the post PRI (S34).

The signal processor 30 may perform the 2D windowing and the FFT on the signal from which the fixed target is removed in step S36, and may detect a respiration speed of the passenger and limit the detection distance to a predetermined distance (S38) so as to detect the respiration of the passenger on the rear seat by detecting the change in the upper body due to the respiration (S40).

Such steps S30 to S40 are referred to as "micro speed detection scheme".

In FIG. 5, the pre PRI may correspond to a first chirp signal, and the post PRI may include M chirp signals and a guard time that corresponds to a macro processing time and a delay time.

In addition, the post CPI may be the sum of K post PRIs (Post CPI=Post PRI#1+Post PRI#2+ . . . +Post PRI#K), wherein K=data buffer size of post PRI.

A maximum speed characteristic between the pre PRI and the post PRI may be defined according to Mathematical expressions 3 to 5 below.

$$\text{Pre } PRI \leq \frac{\lambda}{4 \cdot V_{max,pre}} \quad \text{[Mathematical expression 3]}$$

$$\text{Post } PRI \leq \frac{\lambda}{4 \cdot V_{max,post}} \quad \text{[Mathematical expression 4]}$$

$$V_{max,pre} \gg V_{max,post} \quad \text{[Mathematical expression 5]}$$

In other words, a macro maximum speed $V_{max,pre}$ is very large in comparison with a micro maximum speed $V_{max,post}$.

Therefore, in step S38, the signal processor 30 may detect the change caused by the respiration of the passenger, that is, a minute motion by using the maximum detection speed.

In addition, a maximum detection speed resolution between the pre CPI and the post CPI may be defined according to Mathematical expressions 6 to 8.

$$\text{Pre } CPI = \frac{\lambda}{2 \cdot \Delta V_{pre}} \quad \text{[Mathematical expression 6]}$$

$$\text{Post } CPI = \frac{\lambda}{2 \cdot \Delta V_{post}} \quad \text{[Mathematical expression 7]}$$

$$\Delta V_{pre} \ll \Delta V_{post} \quad \text{[Mathematical expression 8]}$$

In other words, a macro speed resolution $\Delta V_{pre}$ is very small in comparison with a micro speed resolution $\Delta V_{post}$.

Therefore, the signal processor 30 may detect the respiration of the passenger on the rear seat by employing the micro speed detection scheme to improve precision of the speed detection.

Figure 6:
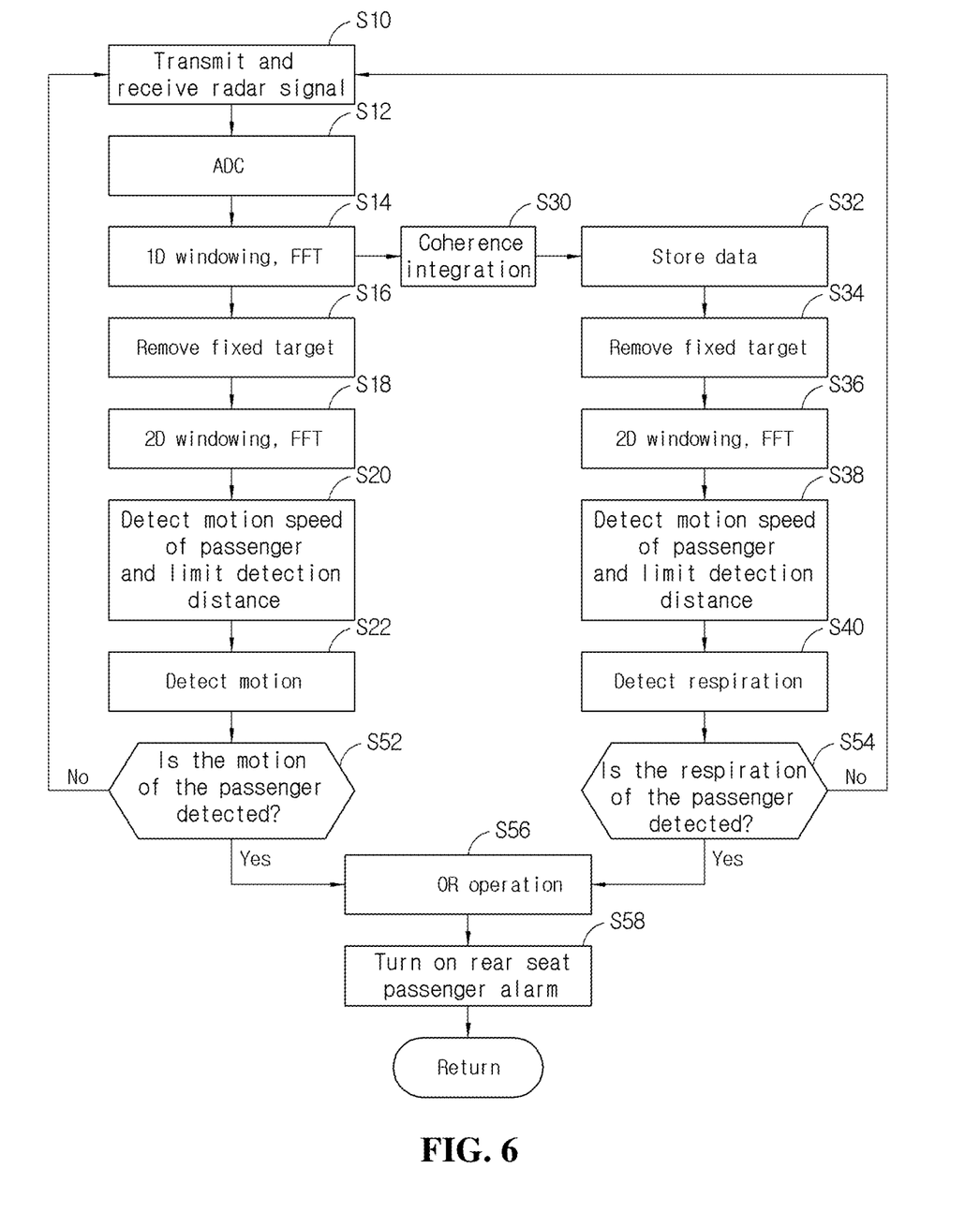
FIG. 6 is a flowchart for describing a method of detecting a passenger on a rear seat step by step by the radar device according to the exemplary embodiment of the present invention.

Next, FIG. 6 is a flowchart for describing a method of detecting a passenger on a rear seat step by step by the radar device according to the exemplary embodiment of the present invention.

In FIG. 6, steps S10 to S22 and steps S30 to S40 are the same as steps S10 to S22 described with reference to FIG. 2 and steps S30 to S40 described with reference to FIG. 4, so the redundant descriptions thereof will be omitted.

After performing step S22, the passenger detector 40 may determine whether the motion of the passenger in the rear seat is detected by the macro speed detection scheme in step S52.

If the motion of the passenger in the rear seat is not detected as a result of the determination in step S52, the controller 50 may proceed to step S10 and repeat subsequent steps.

In addition, after performing step S40, the passenger detector 40 may determine whether the motion of the passenger in the rear seat is detected by the micro speed detection scheme in step S54.

If the motion of the passenger in the rear seat is not detected as a result of the determination in step S54, the controller 50 may proceed to step S10 and repeat the subsequent steps.

Meanwhile, if the motion of the passenger in the rear seat is detected in step S52 or S54, the passenger detector 40 may determine that the passenger in the rear seat is present through an OR operation (S56).

Therefore, the controller 50 may perform a control to notify of a rear seat passenger detection result by turning on a rear seat passenger alarm to operate at least one of a cluster, an alarm, and a headlamp of a vehicle, and to transmit a text message to a pre-stored telephone number through a communication network (S58).

Figure 7:
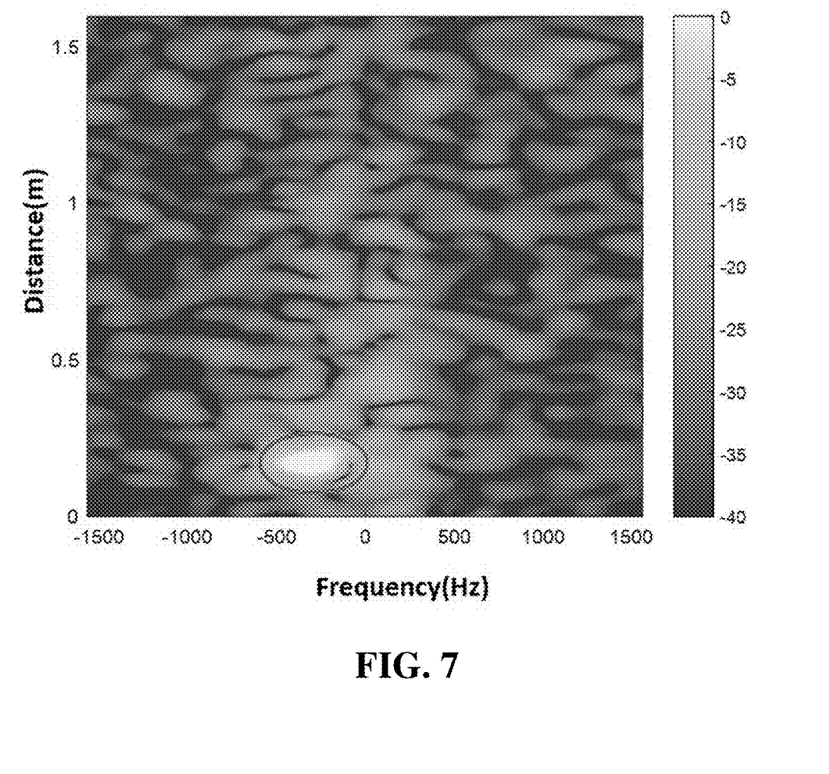
FIGS. 7 and 8 are views illustrating macro and micro speed detection data, respectively.
Figure 8:
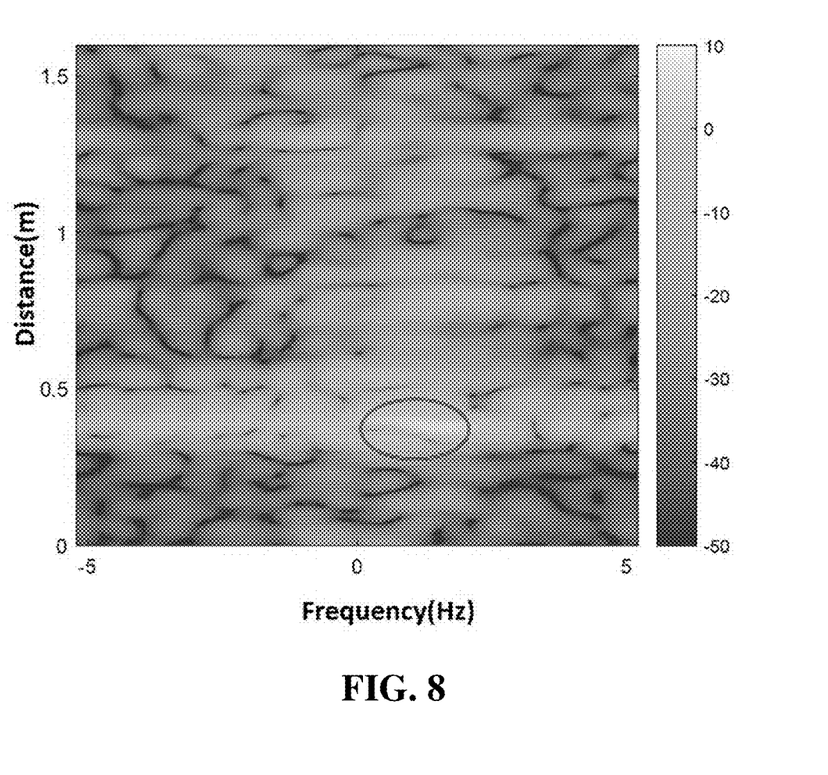

FIGS. 7 and 8 are views illustrating macro and micro speed detection data, respectively.

FIG. 7 illustrates a speed detection result caused by the motion of the passenger, and FIG. 8 illustrates a speed detection result caused by the respiration of the passenger.

A macro speed is a macro Doppler frequency in FIG. 7, and a micro speed is a micro Doppler frequency in FIG. 8.

In this case, a motion speed detection distance may be limited to about 1 m. Naturally, in the present invention, the motion speed detection distance may vary according to characteristics of the vehicle and the passenger.

When the macro speed detection scheme is used, as shown in FIG. 7, the motion of the passenger inside the vehicle is detected at a portion indicated by a red circle.

However, when only the respiration is performed without a motion, the macro speed may not be detected.

Therefore, when the multi-channel high-speed FMCW radar waveform is employed to detect a motion through the micro speed detection scheme in a state in which there is no motion, as shown in FIG. 8, a micro Doppler signal is generated according to the respiration of the passenger inside the vehicle at a portion indicated by a red circle, so that the passenger who is asleep may also be detected.

Through the above process, according to the present invention, the multi-channel high-speed FMCW radar waveform is employed to simultaneously detect the motion of the passenger detected through the macro speed detection scheme and the change caused by the respiration of the passenger detected through the micro speed detection scheme.

In addition, according to the present invention, since the multi-channel high-speed FMCW radar capable of detecting a distance is adopted instead of the conventional CW radar scheme, the influence due to an external interference signal caused by the motion at the periphery of the vehicle is removed, so that the passenger can be detected only within a specific range inside the vehicle.

In other words, according to the present invention, since the multi-channel high-speed FMCW radar waveform is used, it is determined whether the detected target is the passenger or the object through the macro and micro speed detection schemes without being affected by an interference signal from an outside of the vehicle, so that a false alarm for the object can be removed.

In addition, according to the present invention, even when the passenger is in a sleeping state without a motion, the presence of the passenger on the rear seat can be detected by measuring a minute change due to characteristics of the passenger, for example, the respiration, and an alarm can be generated.

Although the present invention invented by the present inventor has been described in detail with reference to the embodiments, the present invention is not limited to the above embodiments, and various modifications are possible without departing from the scope and spirit of the present invention.

INDUSTRIAL APPLICABILITY

The present invention may be applied to a radar device and a rear seat detection method thereof, in which a multi-channel high-speed FMCW radar waveform is employed to simultaneously detect a motion of a passenger detected through a macro speed detection scheme and a change caused by respiration of the passenger detected through a micro speed detection scheme, so that the passenger of a rear seat may be accurately detected.

The invention claimed is:

1. A method of detecting a passenger on a rear seat by using a radar device, the method comprising:
   (a) transmitting a radar signal in a form of a multi-channel high-speed frequency-modulated continuous wave (FMCW) to a periphery of the rear seat and receiving a signal reflected from a target by a transceiver;
   (b) detecting a motion of the passenger through a macro speed detection scheme by a signal processor configured for processing the received signal;
   (c) detecting a change according to characteristics of the passenger through a micro speed detection scheme; and
   (d) determining, by a passenger detector, that the passenger is present on the rear seat when the motion or the change is detected in step (b) or step (c), detecting a distance to the target, a motion of the passenger, and a change rate according to characteristics of the passenger based on the processed signal, removing peripheral interference of a vehicle by limiting the detected distance to the target, and comparing the motion and the change rate, and wherein the micro speed detection scheme is for detecting the change caused by respiration of the passenger by using a repetition interval corresponding to a plurality of repetition intervals of a chirp signal which is used for the detection in the macro speed detection scheme.

2. The method of claim 1, wherein step (b) includes:
(b1) converting a detection signal which is in a form of an analog signal into a digital signal by an AD converter provided in the signal processor;
(b2) removing a fixed target after performing 1D windowing and FFT on the detection signal which is converted into the digital signal; and
(b3) detecting a motion speed of the passenger by performing 2D windowing and the FFT on the signal from which the fixed target is removed, and detecting the motion of the passenger by limiting the detected distance to a predetermined distance.

3. The method of claim 2, wherein step (c) includes:
(c1) removing the motion speed by performing coherence integration on data which is obtained by performing the 1D windowing and the FFT in step (b2), and storing the data as a post-pulse repetition interval;
(c2) removing the fixed target by using the data stored as the pulse repetition interval; and
(c3) detecting the change caused by the respiration of the passenger by performing the 2D windowing and the FFT on the signal from which the fixed target is removed, and detecting the respiration of the passenger by limiting the detection distance to the predetermined distance.

4. The method of claim 1, further comprising (e) performing a control, by a controller, to notify of a rear seat passenger detection result by turning on a rear seat passenger alarm to operate at least one of a cluster, an alarm, and a headlamp of the vehicle, and to transmit a text message to a pre-stored telephone number through a communication network.

5. A radar device for detecting a passenger on a rear seat, the radar device comprising:
a transceiver for transmitting a radar signal in a form of a high-speed frequency-modulated continuous wave (FMCW) through multiple channels and receiving a reflected signal;
a signal processor for processing the signal received by the transceiver; and
a passenger detector for detecting the passenger on the rear seat by detecting a distance to a target, a motion of the passenger, and a change rate according to characteristics of the passenger based on the processed signal, removing peripheral interference of a vehicle by limiting the detected distance to the target, and comparing the motion and the change rate, wherein the signal processor detects the motion of the passenger through a macro speed detection scheme and detects a change according to the characteristics of the passenger through a micro speed detection scheme, and the micro speed detection scheme is for detecting the change caused by respiration of the passenger who is asleep by using a repetition interval corresponding to a plurality of repetition intervals of a chirp signal which is used for the detection in the macro speed detection scheme.

6. The radar device of claim 5, further comprising a controller for controlling driving of each device,
wherein the controller performs a control to notify of a rear seat passenger detection result by operating at least one of a cluster, an alarm, and a headlamp of the vehicle, and to transmit a text message to a pre-stored telephone number through a communication network when the passenger is detected in the rear seat.

\* \* \* \* \*